March 9, 1943.　　　M. J. BALDWIN　　　2,313,502
CURRENT COLLECTING DEVICE
Filed Dec. 23, 1941　　　3 Sheets-Sheet 1
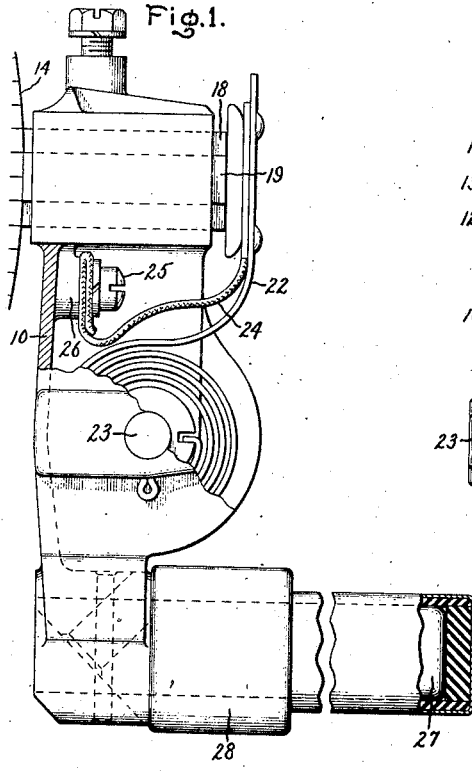
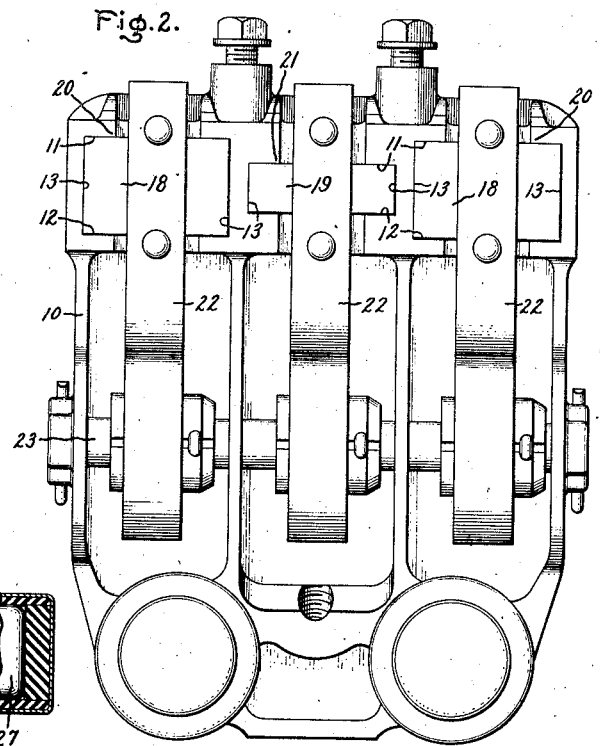
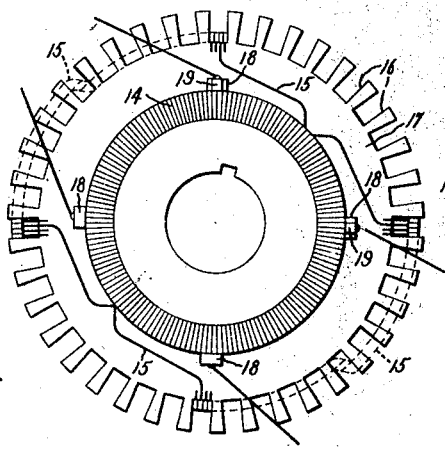
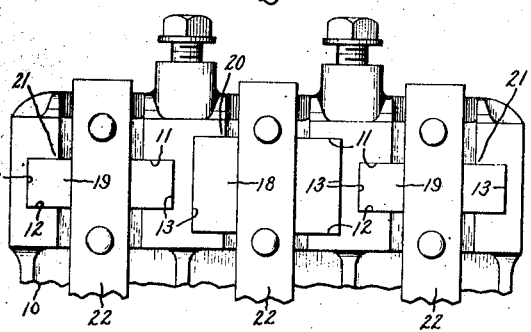
Inventor:
Morris J. Baldwin,
by Harry E. Dunham
His Attorney.

March 9, 1943. M. J. BALDWIN 2,313,502
CURRENT COLLECTING DEVICE
Filed Dec. 23, 1941  3 Sheets-Sheet 2

Inventor:
Morris J. Baldwin,
by Harry E. Dunham
His Attorney.

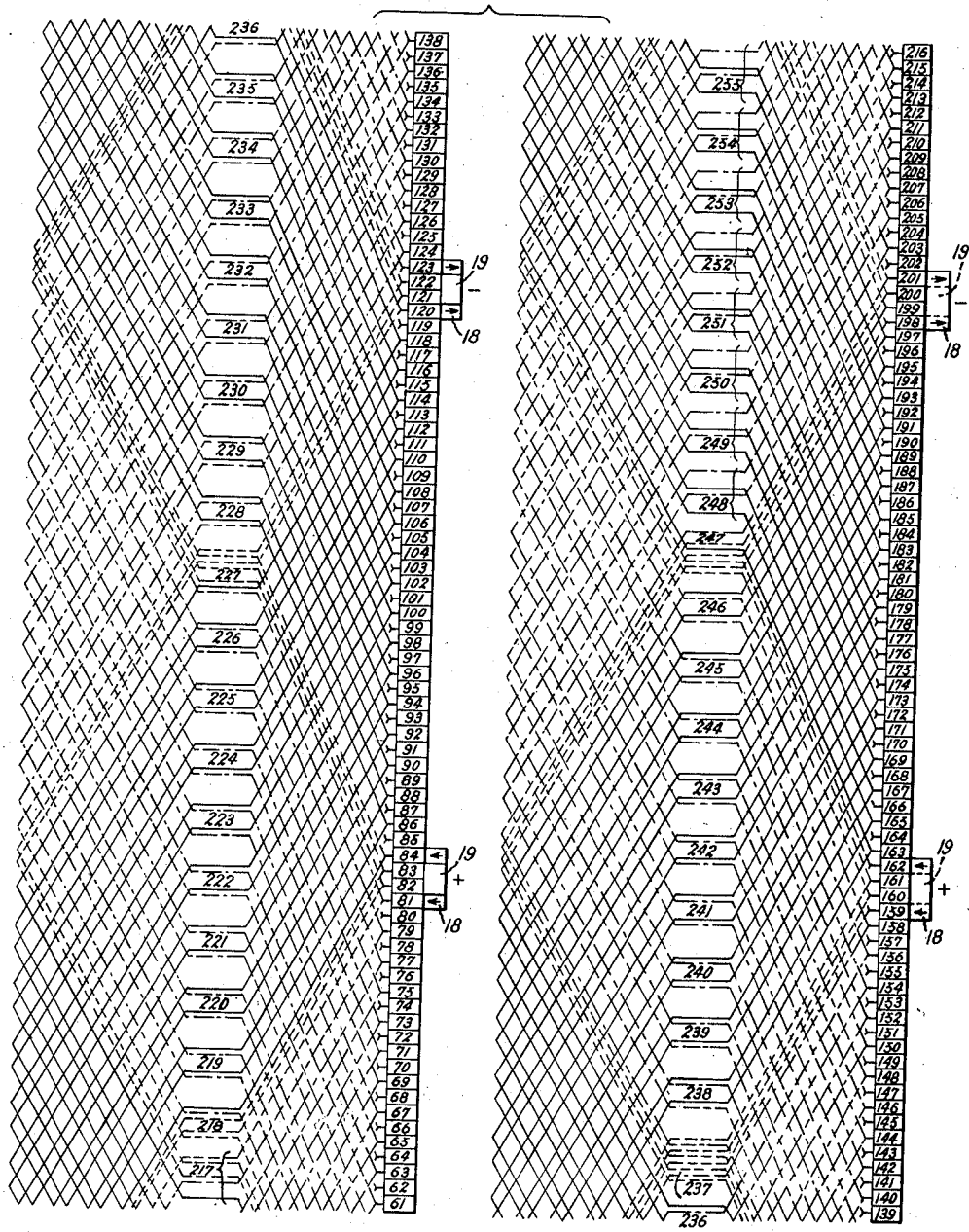

Patented Mar. 9, 1943

2,313,502

UNITED STATES PATENT OFFICE 2,313,502

CURRENT COLLECTING DEVICE

Morris J. Baldwin, Erie, Pa., assignor to General Electric Company, a corporation of New York Application December 23, 1941, Serial No. 424,149

7 Claims. (Cl. 171—323)

My invention relates to current collecting devices and to a system of current collecting devices for a dynamoelectric machine of the commutator type wherein the armature winding connected to the commutator is of the multiplex type.

An object of my invention is to provide an improved current collecting device for a commutator of a dynamo-electric machine having an armature provided with a multiplex winding.

Another object of my invention is to provide an improved current collecting system for a commutator of a dynamo-electric machine armature provided with a multiplex winding.

Further objects and advantages of my invention will become apparent and my invention will be better understood from the following description referring to the accompanying drawings, and the features of novelty which characterize my invention will be pointed out with particularity in the claims annexed to and forming part of this specification.

Figure 5:
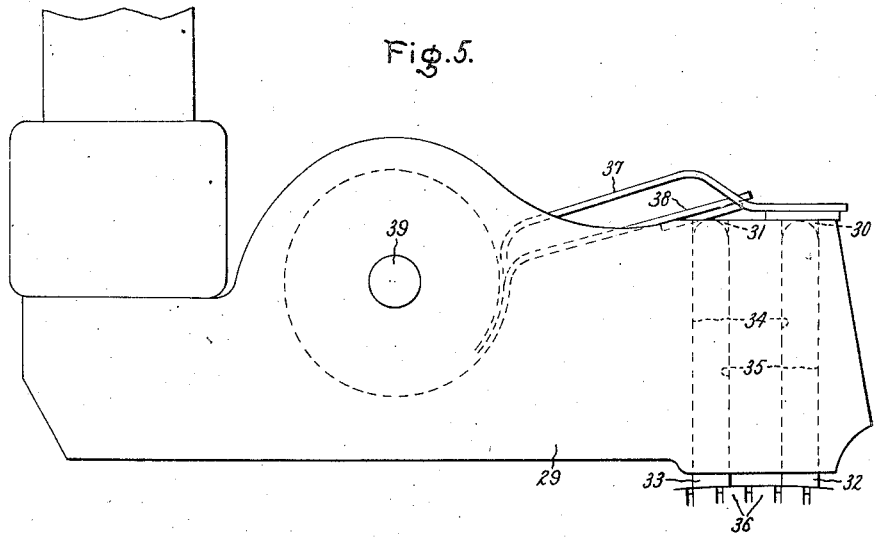
Figure 6:
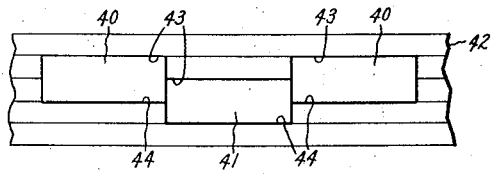
Figure 7:
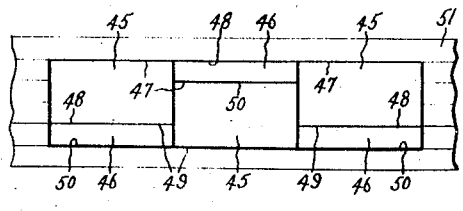
Figure 8:
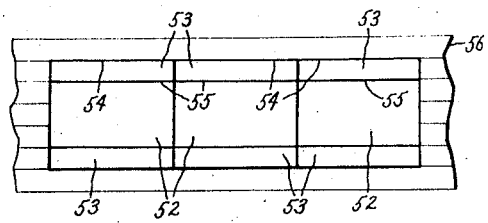

In the drawings, Fig. 1 is a side view, partly broken away, of a current collecting device embodying my invention; Fig. 2 is a plan view of a current collecting device similar to that shown in Fig. 1; Fig. 3 is a schematic diagram of the rotatable member of a dynamo-electric machine provided with my improved current collecting system; Fig. 4 is a plan view of a part of the current collecting device shown in Fig. 1; Fig. 5 is a partial side elevational view of a current collecting device illustrating another embodiment of my invention; Figs. 6, 7, and 8 schematically illustrate other current collecting device arrangements embodying variations of my invention; and Fig. 9 shows a development of part of an armature winding to which my invention is particularly applicable.

Referring to the drawings, I have shown in Figs. 1, 2, and 4 a current collecting device including a brush holder 10 having a plurality of brush holder units each provided with a pair of oppositely disposed brush guiding and supporting surfaces 11 and 12 at the front and back thereof and with side guiding surfaces 13. The guiding surfaces of each brush holder unit are adapted to guide a current collecting brush towards the outer periphery of segments 14 of a commutator. The segments 14 of the commutator are adapted to be connected to an armature winding of the conventional direct current type.

Direct current armature windings may be multiple or series wound, and the series wound armature provides an advantage in not requiring that the circuits through the armature be equal to the number of poles of the machine. A series wound armature requires a minimum of two circuits from a positive to a negative current collecting brush, although the number of circuits may vary anywhere from two circuits to a number of circuits equal to the number of exciting poles of the machine for the entire machine. Series windings of this type are often of the multiplex or plural spiral type such as that shown in Fig. 9; that is, a complete circuit through the armature, beginning at any desired commutator segment and returning to that same segment is obtained only after the current has passed completely around the armature more than once. A multiplex winding with two spirals, that is, a duplex winding, is illustrated in Figs. 3 and 9. In the development in Fig. 9 only one of the spirals is shown for simplicity. By starting with commutator segment 82 and going to the left through the winding to winding slot 218, to slot 247, segment 161, to slot 237, slot 227, segment 84, etc., through all of the winding shown, the end of the winding will be segment 83 which is next to the first segment 82. Thus, a complete spiral or path has been traversed but only every other commutator segment has been reached. By continuing from segment 83 through another similar spiral or path, the odd numbered segments will be reached and the winding will close on the first segment 82. This second spiral has been omitted in Fig. 9 in order to simplify the diagram and only the leads have been shown on the commutator segments. Thus, with such a winding it is necessary to go through two complete spirals or progressive paths around the machine before the winding closes on itself as a complete series circuit. Multiplex or plural spiral series windings may extend about the armature any desired number of times in order to complete a circuit through all the coils from any single commutator bar. It is not necessary that each circuit be completed from any specific commutator bar, but the winding may be connected such that a number of circuits act in multiple or parallel; that is, equalizing connections may be arranged about the armature winding to connect together electrically substantially equipotential points in the winding. Such equipotential points may shift continuously through the armature winding as it rotates but may remain relatively fixed in space. In such a case the connections can be obtained by providing current collectors which are adapted to contact these equipotential points of the armature winding. In order to insure good commutation and provide against localized circuits or excessive heating of certain parts of the armature winding, it is desirable that such current collectors at all times complete these multiple circuits; that is, it is important that adjacent commutator bars connected to different spirals of the multiplex series winding should all be contacted by current collectors having the same potential. This simplifies the armature construction, as it eliminates the necessity of equalizer connections, but it has been found that conventional current collecting devices often tend to provide a good electrical contact with certain paths of a multiplex spiral winding and not provide an equally good electrical contact with the commutator segments connected to other paths of the winding. This results in bright commutator segments connected to the spiral or portion of the winding which forms good electrical contact with the current collecting device and black or burned and pitted commutator segments connected to the armature spiral or path which does not have a good electrical contact with the current collecting device. In some instances, such a condition has been found to have become so aggravated that the commutator segments and the brush holder become heated to such a degree as to melt the brush holder. In order to prevent this undesirable condition, I provide an improved current collecting device for multiplex or plural spiral series armature windings which insures good electrical contact of a current collecting brush with each spiral of the multiplex or spiral armature winding.

In Fig. 3, I have shown a conventional double spiral or duplex series armature winding including coils 15 arranged in winding slots 16 of an armature core 17 and connected to commutator segments 14. It has been found that if such an armature is operated in opposite directions, the current collecting brushes may provide a good electrical contact with each circuit of the multiplex or spiral winding for one direction of rotation, but may become tilted and provide good electrical contact with only one spiral or path of the multiplex or spiral winding for rotation of the armature in the opposite direction, thereby not providing good commutation for each direction of rotation of the armature. In order to overcome this difficulty, I provide an improved current collecting device wherein guiding surfaces 11 and 12 of the brush holder units are arranged in circumferentially spaced apart relationship so as to extent over commutator segments connected to different spirals of the armature winding, so that at least one guiding surface is provided for each winding spiral for each of the oppositely disposed pairs of guiding surfaces. In a double spiral or duplex winding as shown in Figs. 3 and 9, adjacent commutator segments are connected to different spirals of the winding. In order to insure contact with each spiral of the winding for both directions of rotation of the armature, each current collecting device is provided with wide and narrow current collecting brushes 18 and 19 arranged in wide and narrow brush holder units 20 and 21, respectively. The guiding surfaces 11 and 12 of the wide and narrow brush holder units 20 and 21 are circumferentially staggered or spaced apart such that one of these units is adapted to extend over each of the two winding spirals. The brushes 18 and 19 are adapted to be biased into contact with the commutator segments 14 by brush holder biasing springs 22 which are mounted on a supporting pin 23. In order to prevent overheating of the biasing spring 22, a lead 24 of electrically conductive material is connected to the end of the spring 22 which contacts the brushes and is secured by a screw 25 to a terminal 26 on the brush holder 10. The brush holder 10 is made of electrically conductive material and is provided with a stud 27 arranged within an insulating bushing 28 adapted to be secured by any suitable mounting to the frame of the machine. In this manner, if the brushes 18 and 19 tend to tilt in one direction for clockwise rotation of the armature, these different brushes will contact different spirals of the double-spiral or duplex winding, and for rotation in a counter-clockwise direction, each of these brushes will contact a commutator segment connected to the other spiral from that contacted by the same brush for clockwise rotation. In either case, both spirals will always be contacted by one or the other of the brushes 18 and 19. I have found it desirable to provide more than two current collecting brushes for each current collecting device to assure good contact with each spiral.

In order to prevent overheating of the brushes, I have found it desirable to arrange the current collecting devices in a system which includes pairs of devices. The current collecting devices in one of these pairs is provided with two wide brushes or current collecting brush holder units 20 and one narrow unit 21, and the current collecting devices of the other pair are provided with two narrow brushes or current collecting brush holder units 21 and a single wide brush or current collecting brush unit 20. The minimum number of brushes per device would be two, or a number equal to the number of spirals, one of which would be thick, the other thin. Three per holder, as described herein, is better and a larger number of brushes for each stud might in some instances be found desirable. In order to obtain equal current carrying capacity for each spiral of the armature winding, the number of thick and thin brushes is reversed for different pairs of current collecting devices; that is, the current collecting devices in one of the pairs is provided with two thin brushes and one thick brush, as shown in Figs. 1 and 4, and the current collecting devices in the other pair are provided with two thick brushes and one thin brush, as shown in Fig. 2. In this manner, circumferentially successive corresponding guiding surfaces 11 and 12 of pairs of circumferentially successively arranged collecting devices extend over commutator segments connected to the same winding spiral, and circumferentially successive corresponding guiding surfaces of adjacent pairs of current collecting devices are arranged to extend over commutator segments connected to different winding spirals as is shown in Fig. 3.

Substantially the same result can be obtained by providing a brush holder 29, as in Fig. 5, having relatively narrow brush holder units 30 and 31 which are adapted to support and guide relatively narrow collector brushes 32 and 33, respectively. Corresponding guiding surfaces 34 and 35 of the brush holder units 30 and 31 are arranged to extend over the commutator segments 36 connected to different spirals of a double spiral or duplex series armature winding. This is obtained by spacing the corresponding surfaces 34 and 35 of the brush holder units 30 and 31 an odd number of segments apart. As shown in Fig. 5, these corresponding guiding surfaces are spaced apart to extend over commutator bars spaced three segments apart and the brushes are made of a width equal to one and one-half times the width of commutator segments. This insures contact with both spirals of the armature winding irrespective of the direction of rotation of the commutator and irrespective of any tilting of the brushes due to the direction of rotation of the machine. The brushes 32 and 33 are biased into good electrical contact with the commutator segments 36 by brush holder springs 37 and 38 which are mounted upon a supporting pin 39 secured to the brush holder 29.

Various modifications of the brush holder structure can readily be made in order to adapt it to the particular type frame and brush holder mounting provided with the machine. In Figs. 6, 7, and 8, I have shown various arrangements of current collecting devices for multiplex or spiral series windings and have merely illustrated the relative arrangement of the collector brushes in the current collecting brush units, as the brush holder structure adapted to support these brushes may include any conventional brush holder features and may be mechanically similar to the brush holder structures shown in Figs. 1 to 5, inclusive.

In Fig. 6, the brushes 40 and 41 are of substantially the same width and are arranged to extend over substantially two of the commutator bars 42. These brushes are arranged to be supported on guiding surfaces in a brush holder such that corresponding surfaces 43 and 44 of the circumferentially spaced apart brushes 40 and 41 also are circumferentially spaced apart or staggered substantially the width of one commutator segment and extend over commutator segments connected to different spirals of the winding. Thus, if the brushes 40 and 41 tend to tilt in either direction due to rotation of the commutator, contact between commutator collector brushes and commutator segments connected to each spiral of the winding is insured. In this construction, as in that shown in Fig. 5, corresponding surfaces of the circumferentially spaced apart brushes are staggered or spaced apart a distance equal to an odd number of commutator segments, in this instance the width of a single commutator segment.

In Fig. 7, I have shown another modification of my invention wherein wide and narrow collector brushes 45 and 46 are adapted to be supported by a current collecting device for a commutator of a dynamo-electric machine armature having a double spiral or duplex winding. Each of the wide and the narrow collector brushes is adapted to be provided with its individual biasing spring in a current collecting device construction similar to that shown in Fig. 5. Corresponding surfaces 47 and 48 of the wide and narrow brushes 45 and 46 and corresponding surfaces 49 and 50 of the wide and narrow brushes 45 and 46, respectively, are arranged to extend over segments 51 of the commutator connected to different spirals of the armature winding. This is obtained as in the other construction by circumferentially spacing apart corresponding surfaces of the tandem brushes for distances equal to an odd number of commutator segments.

Fig. 8 shows a further modification of my invention, wherein wide and narrow brushes 52 and 53, respectively, are provided, and narrow brushes 53 are arranged on each side of the wide brushes 52. In this arrangement, corresponding surfaces of all of the wide brushes are all axially in alignment, and corresponding surfaces of each set of narrow brushes also are in axial alignment. However, corresponding surfaces 54 of the narrow brushes 53 and surfaces 55 of the wide brushes 52 are circumferentially spaced apart a distance equal to an odd number of commutator segments. As in the other arrangements, this insures contact of a current collecting brush with commutator segments 56 connected to both spirals of the double spiral or duplex armature winding, irrespective of the direction of rotation of the commutator.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A current collecting device for a commutator of a dynamo-electric machine armature having a multiplex winding with a plurality of progressive spirals about the armature including a plurality of units of brush guiding and supporting surfaces, each of said units including a pair of circumferentially spaced apart oppositely disposed guiding surfaces, the number of said units of brush guiding and supporting surfaces being at least equal to the number of said spirals of said multiplex winding, corresponding guiding surfaces of certain of said units being spaced circumferentially apart to extend over a commutator segment connected to a different spiral of said winding and constructed and arranged to provide at least one of said corresponding guiding surfaces for each winding spiral for opposite sides of brushes.

2. A current collecting device for a commutator of a dynamo-electric machine armature having a multiplex winding with a plurality of progressive spirals about the armature including a plurality of units of brush guiding and supporting surfaces, each of said units including a pair of circumferentially spaced apart guiding surfaces providing two sets of oppositely disposed guiding surfaces, the number of said units of brush guiding and supporting surfaces being at least equal to the number of said spirals of said multiplex winding, corresponding guiding surfaces of certain of said units being spaced circumferentially apart to extend over a commutator segment connected to a different spiral of said winding providing at least one guiding surface for each winding spiral for each of said oppositely disposed sets of guiding surfaces.

3. A current collecting device for a commutator of a dynamo-electric machine armature having a duplex winding with a plurality of progressive spirals about the armature including three units of brush guiding and supporting surfaces, each of said units including a pair of circumferentially spaced apart oppositely disposed guiding surfaces, and adjacent corresponding guiding surfaces of said units being spaced circumferentially apart to provide for guiding brushes which extend over different commutator segments connected to different spirals of said winding.

4. A current collecting device for a commutator with adjacent segments connected to different spirals of a duplex armature winding with a plurality of progressive spirals about the armature including a plurality of units of brush guiding and supporting surfaces, each of said units including a pair of circumferentially spaced apart guiding surfaces providing a plurality of sets of oppositely disposed guiding surfaces, the number of said units of brush guiding and supporting surfaces being at least equal to the number of said spirals of said duplex winding, corresponding guiding surfaces of certain of said units being spaced circumferentially apart corresponding to an odd number of commutator segments.

5. A current collecting device for a commutator of a dynamo-electric machine armature having a duplex winding with a plurality of progressive spirals about the armature including a plurality of units of brush guiding and supporting surfaces, each of said units including a pair of circumferentially spaced apart guiding surfaces providing a plurality of sets of oppositely disposed guiding surfaces, corresponding guiding surfaces of certain of said units being spaced circumferentially apart to extend over a commutator segment connected to a different spiral of said winding and constructed and arranged to provide at least one guiding surface for each winding spiral for each of said oppositely disposed sets of guiding surfaces.

6. A current collecting system for a commutator of a dynamo-electric machine armature having a duplex winding with a plurality of progressive spirals about the armature provided with a plurality of current collecting devices each including three units of brush guiding and supporting surfaces, each of said units including a pair of circumferentially spaced apart oppositely disposed guiding surfaces, adjacent corresponding guiding surfaces of said units being spaced circumferentially apart to extend over a commutator segment connected to different spirals of said winding; said devices being arranged in pairs about the commutator such that circumferentially successive corresponding guiding surfaces of pairs of circumferentially successively arranged collecting devices extend over commutator segments connected to the same winding spiral with circumferentially successive corresponding guiding surfaces of adjacent pairs of said devices arranged to provide for guiding brushes which extend over different commutator segments connected to different winding spirals.

7. A current collecting system for a commutator of a dynamo-electric machine armature having a multiplex winding with a plurality of progressive spirals about the armature provided with a plurality of current collecting devices each including a plurality of units of brush guiding and supporting surfaces, each of said units including a pair of circumferentially spaced apart oppositely disposed guiding surfaces, the number of said units of brush guiding and supporting surfaces being at least equal to the number of said spirals of said multiplex winding, corresponding guiding surfaces of certain of said units being spaced circumferentially apart to extend over a commutator segment connected to a different spiral of said winding and constructed and arranged to provide at least one of said corresponding guiding surfaces in oppositely disposed arrangement for each winding spiral, said devices being arranged in pairs about the commutator such that circumferentially successive corresponding guiding surfaces of pairs of circumferentially successively arranged collecting devices extend over commutator segments connected to the same winding spiral with circumferentially successive corresponding guiding surfaces of adjacent pairs of said devices arranged to provide for guiding brushes which extend over different commutator segments connected to different winding spirals.

MORRIS J. BALDWIN.